NON-DESTRUCTIVE READOUT OF MAGNETIC CORES

Filed March 19, 1958

INVENTORS
ARTHUR V. POHM
THOMAS D. ROSSING
EARL N. MITCHELL
BY Cushman, Darby & Cushman
ATTORNEYS United States Patent Office 3,125,743

Patented Mar. 17, 1964

3,125,743
NON-DESTRUCTIVE READOUT OF MAGNETIC CORES

Arthur V. Pohm, White Bear Lake, Thomas D. Rossing, Northfield, and Earl N. Mitchell, St. Paul, Minn., assignors to Sperry Rand Corporation, New York, N.Y., a corporation of Delaware Filed Mar. 19, 1958, Ser. No. 722,584
28 Claims. (Cl. 340—174)

This invention relates to non-destructive readout or sensing of the remanent magnetization of magnetic cores.

As used herein, the term "non-destructive readout" of the remanent state of magnetic cores refers to the detection of the relative direction of remanent magnetization of a magnetic core without destroying or reversing such remanent magnetization. This does not imply that the remanent magnetization is not temporarily disturbed, at least during the detection of said magnetization.

As the use of magnetic cores in digital computing machinery becomes increasingly popular, one desire of those attempting to increase the computational speeds of these machines is to obtain magnetic cores which may be non-destructively readout. In retaining the same state of remanent magnetization, non-destructive readout eliminates the restoration cycle usually required with static magnetic memories, thereby conserving time and possibly equipment.

The magnetic material used in these cores preferably exhibits a rectangular hysteresis charactersitic such that the residual magnetization is a relatively large percentage of the applied saturating magnetic field. The information stored in each core is arbitrarily defined as one of the two possible directions of remanent magnetization. In digital machines usually one direction of remanent magnetization is arbitrarily designated as representing a binary "1" and the second direction a binary "0." These cores are used both individually and in arrays of cores such as matrices, for example, to store information as above described.

This invention may be employed to sense the state of a core non-destructively whether the core is being used individually, or as one of a plurality thereof such as in shifting registers, matrices and the like. The invention may be used to its best advantage when the core to be non-destructively readout is a thin film type magnetic core, such as formed for example by the evaporation or deposition process disclosed and claimed in the co-pending application of S. M. Rubens, Serial No. 599,100, filed July 20, 1956, now Patent No. 2,900,282, and this application will proceed relative to such magnetic films. The use of such thin magnetic films in single element circuits and in multi-element circuits such as matrices is disclosed and claimed in the co-pending application of Rubens et al., Serial No. 626,945, filed December 7, 1956, now Patent No. 3,030,612. In the former of these two applications, there is a teaching of the evaporation and deposition of magnetic material on a substrate to form a very thin film whose thickness may be controlled. In the latter mentioned application, the use of a so-deposited film in conjunction with windings in the form of flat conductors or printed circuits is taught. The present invention adds to this the use of a second core, preferably of the thin film type, disposed adjacent the first core with the coercivity of the second core being substantially less than the coercivity of the first core. Under such circumstances, the currents through the winding may be regulated so that the first core will not shift upon the application of a given interrogating field, but the second core will shift or not according to its state, to cause an output signal which indicates the magnetic state of the first core.

It is therefore a primary object of this invention to provide improved apparatus for causing non-destructive readout of a magnetic core.

Another object of this invention is the provision of magnetic memory apparatus comprising two thin film cores wherein the remanence of one core may be indicated without destroying the remanent state of said one core, while the other core shifts its magnetic state.

Another object of this invention in conjunction with the last preceding object is the provision of the two cores with differing coercivities and with different external magnetic field intensities.

Another object of this invention is to provide a magnetic memory apparatus comprising two thin film cores wherein the remanence of one film magnetically biases a second film.

Still another object of this invention is the provision in a two core memory apparatus of an interrogating magnetic field which switches one of said cores only when the other core is in a predetermined magnetic state.

It is a further object of this invention to provide magnetic memory apparatus which can be non-destructively readout but requires only the usual windings of a coincident current magnetic core memory system.

It is still another object of this invention to provide magnetic memory apparatus which can be switched or non-destructively readout which requires only one winding thereon.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

As before indicated, the embodiments of this invention will be described relative to thin film cores such as those formed in accordance with the aforementioned application of S. M. Rubens, Serial No. 599,100, now Patent No. 2,900,282, and in the simplified exemplary embodiment of FIGURE 1, cores 10 and 12 may be of such type. These cores are illustrated as being square and as having substantial thickness, but it is to be emphasized that the cores need not be square, and that the actual thickness thereof may vary in accordance with needs and may be even smaller than 100 Angstrom units. As pointed out in the Rubens et al. application, Serial No. 626,945, now Patent No. 3,030,612, such deposited cores may be circular or of any other configuration, while thickness thereof, regardless of the shape, may be controlled in accordance with the Rubens application, Serial No. 599,100, to be as desired. The cores both preferably exhibit single domain properties, and for such a core the intensity of the external magnetic field due to the remanence thereof is related as a function of its mass and shape. For purposes of causing the external remanent magnetic field of core 10 to be greater than that of core 12, the former is preferably at least twice as thick, and more preferably five times thicker, than core 12. The desired thickness of the cores is a function of the core geometry, especially the length in the easy direction of magnetization. Generally, the greater the length, the greater the thickness to obtain the desired field.

Although the intensity of the external magnetic field from such a core due to the remanence thereof is related to its core geometry, the field appears to be relatively independent of the coercivity of the core. The coercivity of core 10, which is herein referred to as the memory or information core, is substantially greater than that of the sensing or readout core 12, and is preferably in the order of at least 0.5 to 1.5 oersteds greater. The desired coercivity of each core can be obtained by annealing and magnetic field treatments. Since the coercivities differ, the greater external field intensity of the information core 10 can cause the readout core to follow the information core each time the latter changes from one of its bistable states to the other. That is, the information core is constructed with sufficient thickness to provide a magnetic field in the readout core in the order of one to two oersteds, for example, which in the absence of other magnetic fields, forces the readout core to magnetically follow the remanent magnetization of the information core 10. Thus, when the memory or information core shifts its direction of remanent magnetization, the readout core also shifts its direction of magnetization.

Figures 1, 2, 4:
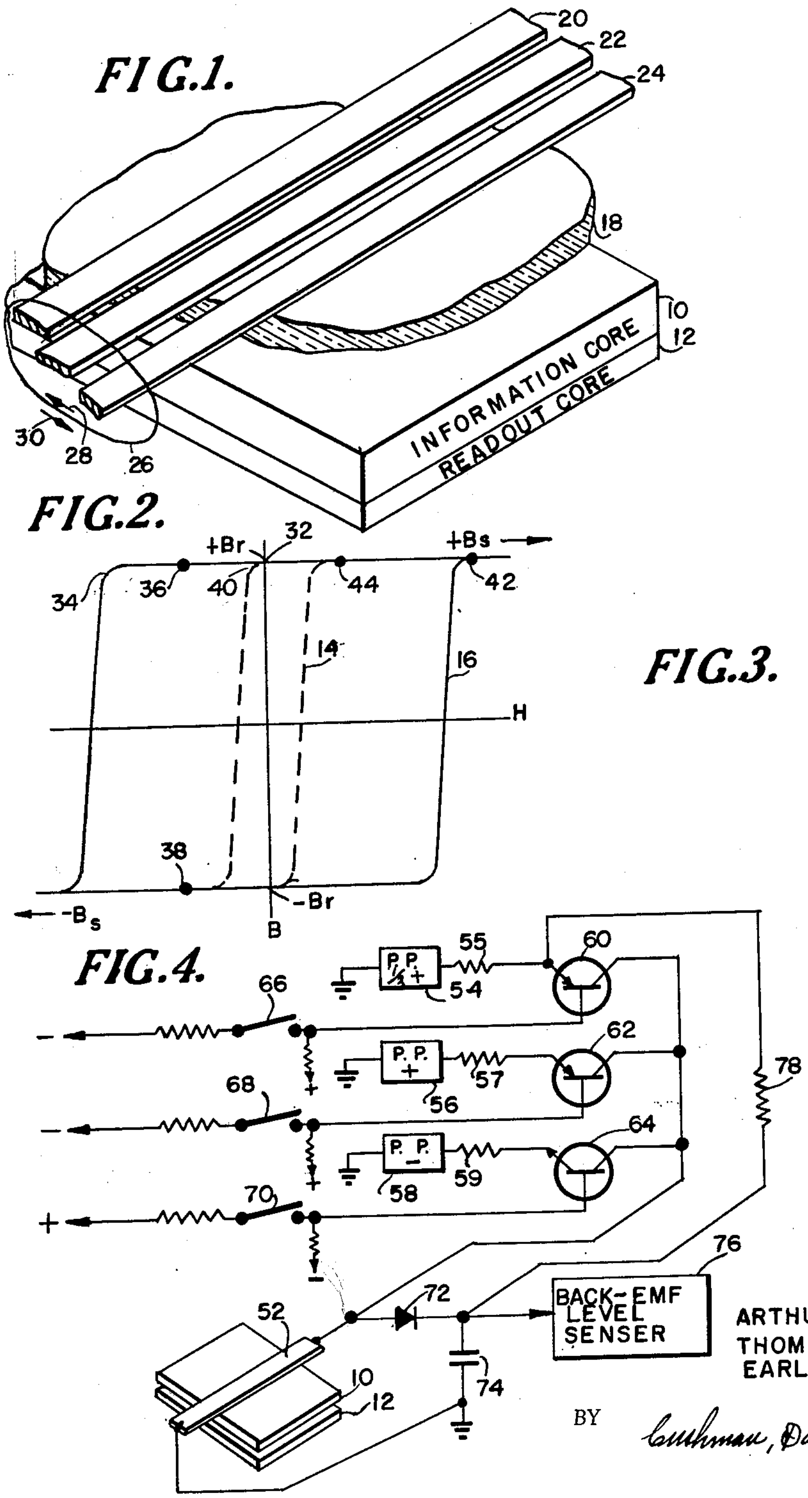
FIGURE 1 illustrates an exemplary embodiment of this invention.
FIGURE 2 is a sketch of substantially idealized hysteresis characteristics for the thin film cores used in the exemplary embodiment of FIGURE 1.
FIGURE 4 is an exemplary embodiment of this invention and associated circuitry therefor, whereby a single winding may be employed for the cores.

As an illustration of the difference in the coercivities of the two cores, reference is made to FIGURE 2. A substantially idealized hysteresis loop for the readout core is shown by dash line 14, while a substantially idealized hysteresis loop for the information core 10 is shown by solid line 16. The differences in the coercivities of the two cores may be measured along the H axis, as is well known.

Memory core 10 stores binary information in one or the other of its two magnetic states, and is the core which by this invention may be readout non-destructively. The information core 10 may be considered as embodied in a one core unit, a multiple core unit, or in a matrix, and in any case, can be readout in accordance with this invention without destroying the information therein. For purposes of explanation, the information core 10 is assumed to be in a multi-dimensional coincident current matrix of the type described and claimed in the above mentioned Rubens et al. application, Serial No. 626,945. As indicated therein and in Rubens application, Serial No. 599,100, thin film cores may be deposited by an evaporation process onto a substrate. Generally, such a substrate is glass, but limitation thereto is not intended. In FIGURE 1, information core 10 is shown as deposited on substrate 18 while readout core 12 is deposited on the information core. There is also preferably a non-magnetic layer (not shown) disposed in between the two cores. Such a layer may be "Mylar" and/or a mineral salt such as chemically pure magnesium fluoride deposited on core 10 in a continuous deposition process. Alternatively, cores 10 and 12 may be deposited on separate substrates and placed in juxtaposition to each other substantially as shown, it being apparent that the two cores need not be contiguous, though preferably so with an non-magnetic layer in between. Any substantial separation between the two cores must be compensated by additional intensity of the external magnetic field from the information core 10 so that the readout core will follow the magnetic state of the information core.

Three windings 20, 22 and 24 are diposed adjacent and in inductive relation to the core assembly. These windings, though shown much narrower than the breadth of either of cores 10 or 12 for convenience, are each preferably a "current sheet" which is about one-third wider than the core assembly so as to provide a more uniform field in both of cores 10 and 12 when drive current is passed therethrough as below indicated. In FIGURE 1, these windings are shown as lying on the substrate 18, but, as will become apparent, they may be disposed, individually or collectively, preferably in a stacked relation on either or both sides of the cores as fully disclosed in the said Rubens et al. application, Serial No. 626,945. Preferably, the windings are printed circuits, although they may be flat conductors as shown, or coils, no limitation being intended.

The three windings may be the same three windings which are normally employed in coincident current memory matrices with windings 20 and 22 being for the purpose of carrying drive currents which select and switch core 10 to cause storage of information therein. In such an arrangement, winding 24 can be used in the usual manner as an inhibit winding whereby a "0" may be written into the information core 10. The magnetic field generated by the currents in each of the windings is oriented generally as indicated by ellipse 26, with the direction thereof being represented by either field vector 28 or 30 depending on the direction of the currents. Thus, it is apparent that cores 10 and 12 are in parallel magnetic circuit with themselves and with respect to the windings. Any change in the m.m.f. in the information core as caused by coincident currents in the windings effects a change in the remanence of the readout core. For purposes of writing information into core 10, drive currents of about 600 ma. may be employed.

To cause non-destructive readout of the binary information stored in core 10, the same three windings 20, 22 and 24 may be used. However, decreased currents are employed so that the information core will not be switched, while the readout core changes its state. That is, with readout currents of about 200 ma. (in keeping with the example above set forth) traversing windings 20 and 22 in the same direction, information core 10 will not change its magnetic state, but readout core 12 will change its magnetic state if the existing state of the readout core is such that the remanent field thereof opposes the field caused by the currents in windings 20 and 22. Under static conditions, i.e., while no interrogating field is applied, the cores rest in opposite relative remanent states; for example, when information core 10 is at $+B_r$, it forces the readout core to a negative remanence, while when core 10 is at $-B_r$, core 12 is forced thereby to positive remanence. To give definite meaning to any readout signal thereby induced in winding 24, the direction of the interrogating field caused by the currents in windings 20 and 22 is arbitrarily selected such that it will oppose the field of the information core at the site of the readout core when the information core is magnetized in the direction arbitrarily designated as the "1" or $-B_r$ state. That is, the interrogating currents are always directed to cause a magnetic field which tends to urge the readout core toward its "0" or $-B_r$ state. With reference to FIGURE 2, this means that an interrogating magnetic field will move the information core from its "1" remanent state at $-B_r$ along its hysteresis loop 16 toward negative saturation such as at least to point 38 while the readout core is moved from $+B_r$ to point 38. It may be noted here that the maximum interrogating field strength is limited to that which does not force the magnetization of core 10 beyond knee 34 of its curve when the two are opposed; for example, the interrogation field only forces the information core when in its "0" state from point 32 to point 36.

The interrogating field, which moves core 10 from $-B_r$ to point 38 on its hysteresis loop, along with the external field of the information core forces readout core 12 to change from its arbitrarily defined "1" state ($+B_r$) to negative or "0" saturation at point 38. Upon cessation of the interrogating magnetic field, the remanent magnetization of information core 10 causes the readout core to change back to its "1" or positive remanence state. Preferably, the field from the information core which causes the change of the readout core back to the "1" or $+B_r$ state is such that it forces the magnetization of the readout core to a point between its knee 40 and its positive or "1" saturation point 42, such as point 44 which is preferably between its normal zero H point 32 and its "1" saturation point 42, rather than all the way into positive saturation. In this manner, the interrogating magnetic field need not be as strong to change the state of the readout core. However, the closer point 44 is to the saturation point 42, the less sensitive is the readout core to noise signals. A satisfactory compromise may be reached in any given situation.

Figure 3:
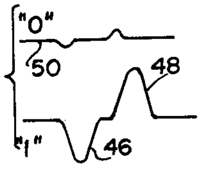
FIGURE 3 illustrates exemplary output voltages resulting from non-destructive readout.

When an interogating magnetic field causes the readout core to change from its resting point 44 to negative saturation at point 38, a negative pulse, such as pulse 46 in FIGURE 3 is induced in winding 24. The forced return of readout core from point 38 back to point 44 causes a positive pulse 48 to be induced in winding 24. Therefore, when information core 10 is in its "1" magnetic state, an indication thereof is obtained by the successive pulses 46, 48 in winding 24. However, when information core 10 is in its "0" magnetic state, the interrogating magnetic field is not in opposition to the direction of magnetization of the readout core, and consequently forces the readout core further into saturation thus inducing a negligible E.M.F. signal in the output winding 24 as shown by waveform 50 in FIGURE 3.

Thus it is seen that the relative direction of the remanent magnetization of the information or memory core 10 is indicated by the readout core 12 switching or not switching during application and removal of a predetermined magnetic interrogating field. That is, assuming the interrogating field is in the direction represented by vector 28 in FIGURE 1, and that the remanent magnetization of information core 10 is in the same direction as the interrogating field so that the biased remanence of the readout core opposes the interrogating field, readout core 12 switches to provide a substantial E.M.F. output signal. However, if the remanent magnetization in core 10 is in the opposite direction as the interrogating field so that the remanence of the readout core is in the same direction as the interrogating field represented by vector 28, an insubstantial E.M.F. signal is induced in the output winding 24. Thus, "1" and "0" output signals are obtained without the information core being shifted.

Alternatively, only one winding need be associated with the core assembly to provide non-destructive readout. For example, with reference to FIGURE 4, cores 10 and 12 may have only one winding 52 associated therewith. Since the switching of a magnetic element which exhibits a rectangular hysteresis characteristic causes a substantial back E.M.F. to be presented to the drive source, switching and interrogating currents as well as a readout signal may be carried on the same winding 52. That is, winding 52 may be employed to apply fields to information core 10 to cause it to shift between its two states, and may be also used to apply an interrogating current as well as carrying the induced output signal which indicates the state of core 10. Three different levels of back E.M.F. are then provided, and it is consequently only necessary to sense the different E.M.F. levels to determine the state of information core 10. Circuitry which may be employed to cause writing of a "1" or of a "0" and to cause non-destructive readout, may include three single polarity power pulse sources 54, 56 and 58 which are respectively connected by series resistors 55, 57 and 59 to the emitter electrodes 60, 62 and 64, the corresponding collector electrodes of which are connected in common to one end of winding 52. Each of the transistors are controlled to be conductive or non-conductive by the application to their base electrodes of given signals via switches 66, 68 and 70 respectively. The series resistors 55, 57 and 59 help provide a constant current source for the respective power pulses. When writing is to be accomplished, one of switches 68, 70, according to whether a "0" or "1" is to be written in core 10, is closed so as to make the respective transistor conductive and to apply a full size one microsecond positive or negative pulse to winding 52. The back E.M.F. which is then generated in winding 52 has a substantially high level, and this E.M.F. is applied by diode 72 across condenser 74 to the E.M.F. level senser 76. For readout purposes, switch 66 is momentarily closed so as to make transistor 60 conductive whereby a positive power pulse of about one-half the size of those from sources 56 and 58 is gated for approximately 0.1 microsecond to winding 52. This does not change the state of the information core 10, but if it is at that time in its "0" state, a substantially small back E.M.F. is generated in winding 52. However, if core 10 is then in its "1" state, a "middle size" back E.M.F. is induced in winding 52. Resistor 78 aids in establishing the readout signals at distinguishable levels. All three of the E.M.F. levels are distinguishably detected by senser 76, and consequently, an indication of the state of core 10 may be obtained without destroying the state thereof when only a single winding is employed. As an alternative, a second winding may be used as the output winding and this is preferred for a better signal to noise ratio.

Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for non-destructive readout of a magnetic core comprising a first open flux path type magnetic core having a substantially rectangular hysteresis characteristic providing only two stable states for at least temporarily storing binary information, a second open flux path type magnetic core having a substantially rectangular hysteresis characteristic providing only two stable states, said second core being disposed in magnetically interacting juxtaposition with the first core, the relative external remanent fields and coercivities of the first and second cores being such that the remanent magnetization of the first core forces the second core to follow the first core in magnetic state at all times but not vice versa, and winding means in inductive relation with both said cores for applying an interrogating magnetic field and for carrying the resultant output signal which is indicative of the state of said first core, one of said cores overlying the other with their remanent magnetization axes being parallel, said interrogating field being applied along said axes and being sufficient to cause said second core to change from one stable state to the other when the first core is in one of its said states but not the other, and being insufficient even when additive to the remanent field of the second core to change the first core from either of its stable states to the other, said second core when thereby changed being reverted to its initial state by the external remanent field of the first core after said interrogating field ceases.

2. Apparatus as in claim 1 wherein said cores are magnetic films.

3. Apparatus as in claim 1 wherein the geometry of said cores relative to each other is predetermined to cause the external remanent field of the said first core to be greater than the external remanent field of the said second core.

4. Apparatus as in claim 3 wherein said cores are open flux path type magnetic films and wherein the first film core is at least twice as thick as the second film core.

5. Apparatus as in claim 1 wherein the interrogating field is always in the same direction regardless of the direction of the said remanent magnetization of said first core.

6. Apparatus as in claim 1 wherein said winding means includes at least two windings one of which is operative in applying said interrogating field and the other of which carries the output signal induced therein upon the application of said interrogating field.

7. Apparatus as in claim 1 wherein the winding means includes a given winding for momentarily carrying a current causing at least part of said interrogating field and then for carrying said resultant output signal.

8. Apparatus for non-destructive readout of a magnetic core comprising first and second magnetic film cores of the open flux path type disposed to magnetically interact, each having a substantially rectangular hysteresis characteristic providing only two magnetic stable states and exhibiting single domain properties, said first core being at least twice as thick as the second core and having a coercivity substantially greater than the coercivity of the second core whereby the second core at all times follows the first core in magnetic state, but not vice versa, with the remanent magnetization of the first core causing the magnetization of the second core to rest at a point on its hysteresis loop between saturation and its resting point when under the influence of no external field, and winding means in inductive relation with both said cores for applying an interrogating magnetic field in a direction so as to oppose the remanent magnetic field of said second core when it is in a given stable state corresponding to a first stable state of said first core and so as to be additive to the remanent field of the second core when it is in its other stable state corresponding to the second stable state of said first core and for carrying the resultant output signal which is indicative of the state of said first core, said cores overlying one another with their remanent axes parallel, said interrogating field being applied along said axes and being sufficient to cause a change in the state of said second core only if the first core is then in said said first state, but being insufficient in either of its directions to cause said first core to switch from either of its stable states to the other, said second core when thereby changed being reverted to its initial state by the external remanent field of the first core after said interrogating field ceases.

9. Apparatus as in claim 8 wherein said winding means includes a printed circuit.

10. Apparatus as in claim 8 wherein said winding means includes three windings, two of which are for carrying coincident currents which create said interrogating field, and the third of which is for carrying said output signal as induced therein after the application of said interrogating field.

11. Apparatus as in claim 8 wherein said winding means includes a given winding for momentarily carrying a current causing at least part of said interrogating field and for subsequently carrying said output signal.

12. Apparatus as in claim 11 and further including E.M.F. level sensing means for detecting different output signal levels of back E.M.F. induced in said given winding at least by a change or no change in the state of the second core as caused by said interrogating field.

13. Apparatus as in claim 1 wherein the coercivity of the second core is substantially less than the coercivity of the first core.

14. A magnetic device comprising two open flux path type multistable state magnetic elements having respective easy magnetization axes and adjacently disposed in magnetically interacting superposed relationship with said axes being substantially in alignment with each other and with each element only partially closing the otherwise open flux path of the other, each of said elements themselves effecting a respective external magnetic field and having a respective coercivity, the said external field of one and one only of said elements being larger than the coercivity of the other to cause that other element to be biased from the instant one of its said stable magnetic states by the said one element alone.

15. A magnetic device comprising two open flux path type multistable state magnetic elements having respective easy magnetization axes and adjacently disposed in magnetically interacting superposed relationship with said axes being substantially in alignment with each other and with each element only partially closing the otherwise open flux path of the other, a first of said elements having a substantially higher coercive force than the second thereof and when in any one of its said stable states effecting itself an external magnetic field larger than the external magnetic field effected by the said second element itself for biasing said second element from the instant one of its said stable magnetic states.

16. A device as in claim 15 wherein the said first element is at least twice as thick as said second element.

17. A device as in claim 15 wherein the said external field of said first element is at least 0.5 oersted greater than the said external field of said second element.

18. A magnetic device comprising two open flux path planar type multistable state magnetic elements having respective easy magnetization axes and being adjacently disposed in magnetically interacting relationship with said axes substantially parallel and with each element only partially closing the otherwise open flux path of the other element, one of said elements itself creating a magnetic field external to itself and sufficient to bias the other element in a direction along a said easy axis of said other element.

19. A magnetic device as in claim 18 wherein said elements are in a superposed relationship.

20. A device as in claim 18 wherein each of said elements has a respective coercivity with that of the said one element being substantially larger than the coercivity of said other element.

21. A device as in claim 20 wherein said elements are in a superposed relationship.

22. A magnetic device comprising two open flux path planar type multistable state magnetic elements having respective easy magnetization axes and being adjacently disposed in magnetically interacting relationship with said axes substantially parallel and with each element only partially closing the otherwise open flux path of the other element, one of said elements having a given coercivity and the other element itself creating a magnetic field external to itself and larger than said coercivity for biasing said one element along a said easy axis of that one element.

23. A device as in claim 22 wherein said other element has a coercivity substantially larger than the said given coercivity of said one element.

24. A magnetic device comprising two open flux path planar type multistable state magnetic elements having respective two magnetization axes and being adjacently disposed in magnetically interacting relationship with said axes substantially parallel and with each element only partially closing the otherwise open flux path of the other element, a first of said elements being at least twice as thick as and having a substantially higher coercive force than the second thereof and when in any one of its said stable states effecting itself an external magnetic field larger by at least 0.5 oersted than the external magnetic field effected by the said second element itself for biasing said second element.

25. A device as in claim 24 wherein the said external field of said first element is larger than the coercive force of said second element.

26. A magnetic device comprising first and second open flux path type magnetic cores each having an effectively single remanent magnetization axis along which its remanent magnetization may lie in either of opposite directions respectively representing two stable magnetic states, said cores being adjacently disposed in magnetically interacting relationship with their said remanent magnetization axes parallel and being differently characterized in that the external field of said first core is effectively higher than the coercivity of the said second core and the external field of the said second core is effectively lower than the coercivity of the said first core for causing said second core to follow the first core in magnetic state but not vice versa.

27. Apparatus for non-destructive readout of a magnetic core comprising first and second open flux path type magnetic cores each having an effectively single remanent magnetization axis along which its remanent magnetization may lie in either of opposite directions respectively representing two stable magnetic states, said cores being adjacently disposed in magnetically interacting relationship with their said remanent magnetization axes parallel and being differently characterized in that the external field of said first core is effectively lower than the coercivity of the said first core for causing said second core to follow the first core in magnetic state but not vice versa, and winding means magnetically coupled to at least said second core for applying an interrogating field along the said second core axis and for carrying the resultant output signal which is indicative of the state of the first core, said interrogation field being characterized by the fact that when the remanent magnetization of said second core opposes the interrogation field due to the first core being in one of its said states the interrogation field is sufficient to cause the second core to change from one to the other of its said stable states but is insufficient then and even when in the same direction as the remanent magnetization of the second core to change the first core from either of its stable states to the other, said second core when changed in state as aforeasid being automatically reverted to its initial state by the said external field of the first core upon subsiding of said interrogating field.

28. Apparatus for non-destructive readout of a magnetic core comprising first and second open flux path type magnetic film cores each exhibiting single domain properties and having an effectively single remanent magnetization axis along which its remanent magnetization may lie in either of opposite directions respectively representing two stable magnetic states, said cores being adjacently disposed in magnetically interacting relationship with their said remanent magnetization axes parallel and being differently characterized in that the said first core is at least twice as thick as the second core to cause the first core to have a greater external field than the second core and in that the coercivity of the second core is effectively less than the said external field of the first core while the coercivity of the first core is effectively larger than the said external field of the second core all for causing the second core to follow the first core in magnetic state but not vice versa with the external field of the first core biasing the mangetization of the second core to a given point on its hysteresis loop between saturation and the adjacent one of its remanent points, and winding means magnetically coupled to at least said second core for applying an interrogating field along the said second core axis and for carrying the resultant output signal which is indicative of the state of the first core, said interrogation field being characterized by the fact that when the remanent magnetization of said second core opposes the interrogation field due to the first core being in one of its said states the interrogation field is sufficient to cause the second core to change from one to the other of its said stable states but is insufficient then and even when in the same direction as the remanent magnetization of the second core to change the first core from either of its stable states to the other, said second core when changed in state as aforesaid being automatically reverted in state to said given point on its hysteresis loop by the said external field of the first core upon subsiding of said interrogation field.

References Cited in the file of this patent

UNITED STATES PATENTS

| | | |
|---|---|---|
| 2,781,503 | Saunders | Feb. 12, 1957 |
| 2,805,407 | Wallace | Sept. 3, 1957 |
| 2,805,408 | Hamilton | Sept. 3, 1957 |
| 2,825,891 | Duinker | Mar. 4, 1958 |
| 2,907,988 | Duinker | Oct. 6, 1959 |
| 2,967,281 | Lee | Jan. 3, 1961 |

OTHER REFERENCES

Publication I: "A Compact Coincident Current Memory," published in Proceedings of the Eastern Joint Computer Conferences, December 10–12, 1956, pp. 120–123.